Oct. 18, 1960 W. H. NOWOTNY 2,956,460
PATCHING APPARATUS
Filed Nov. 29, 1957 2 Sheets-Sheet 2
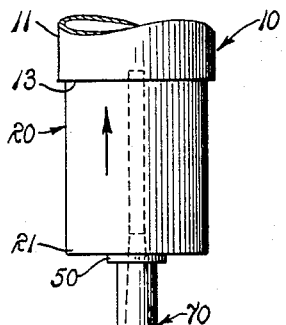
FIG. 4.
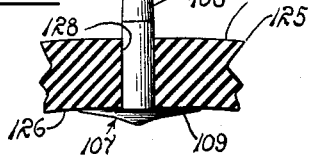
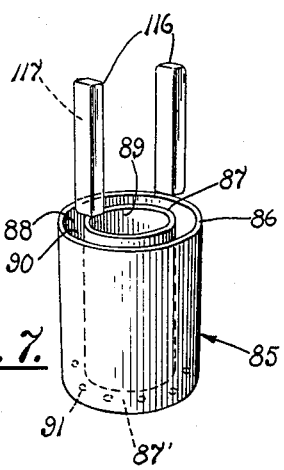
FIG. 7.
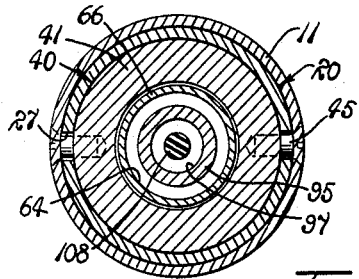
FIG. 5.
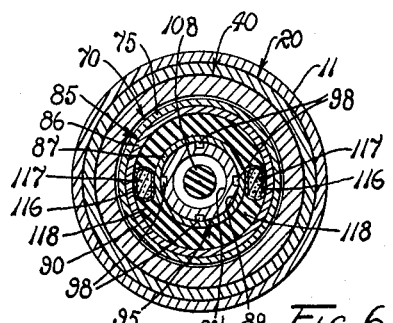
FIG. 6.
FIG. 8.
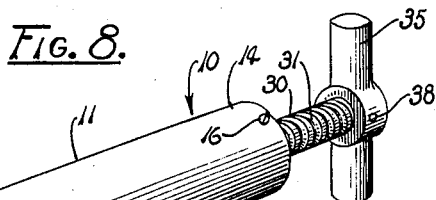
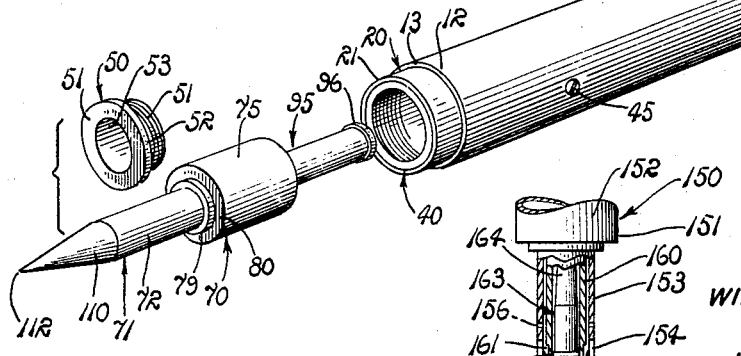
FIG. 9.
WILLIAM H. NOWOTNY
INVENTOR
HUEBNER & WORREL
ATTORNEYS
BY Richard M. Worrel

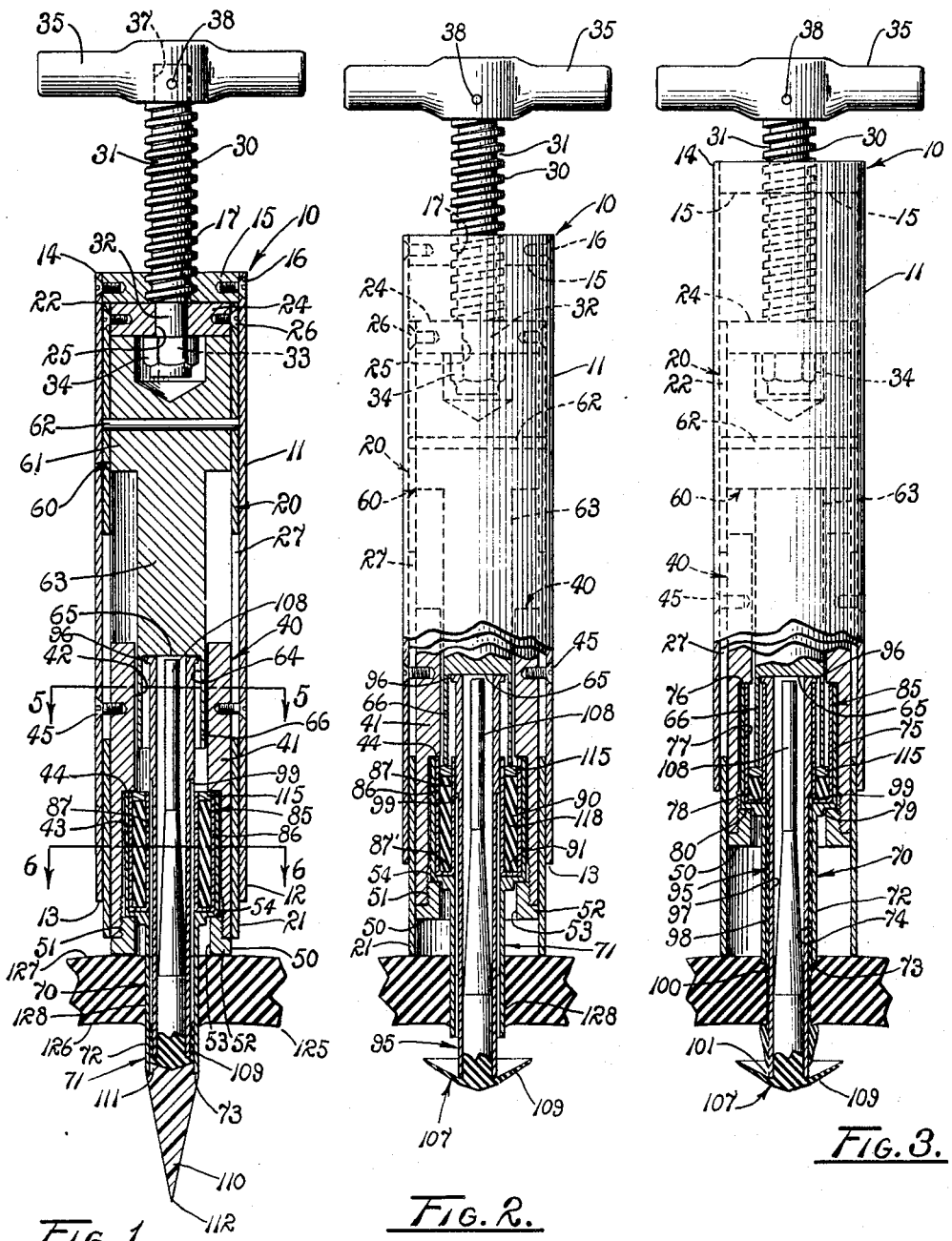

United States Patent Office 2,956,460
Patented Oct. 18, 1960

2,956,460

PATCHING APPARATUS

William H. Nowotny, Fresno, Calif., assignor to Central California Engineering Corp., Fresno, Calif., a corporation of California Filed Nov. 29, 1957, Ser. No. 699,709

6 Claims. (Cl. 81—15.5)

The present invention relates to a patching apparatus and more particularly to an apparatus for inserting a plug and bonding material therefor into a hole in a workpiece, such as a tubeless tire whereby a dependable bond is obtained between the plug and the tire.

The present application is a continuation-in-part of my prior copending application Serial No. 657,640, filed May 7, 1957 for Patching Apparatus. The prior application also relates to the insertion of a plug and a bonding agent therefor into a hole in a workpiece. As explained therein, a tubeless tire does not lend itself to the convenient application of a patch on the internal wall of the tire by vulcanization methods. It is difficult to remove the tire from its rim and to replace it thereon, and damage to the tire may result both from such removal and replacement and in preparation for application of the patch.

Thus, the insertion of a plug into the puncture hole from the outside of the tire while the tire remains inflated on the rim would seem to be an ideal solution to the problem. Several devices are available which attempt to accomplish such plug patching. Whereas in the past such devices have not been fully satisfactory, the apparatus described in my prior patent application is capable of effectively inserting a plug and bonding it to the tire in a minimum of time and with a minimum of effort.

A serious obstacle to the widespread use of such plugs and their inserting tools has been their failure to maintain an air-tight seal under rugged driving conditions. Whereas it may be easier and quicker to patch a tire with the described plugs than by vulcanizing a patch internally of the tire, especially if the apparatus of my above cited patent application is employed, in the past, vulcanized patches have been found to hold more tenaciously to the tire and to outlast the plug type of patch by a considerable degree. Accordingly, plug patching has fallen into disfavor by service stations, tire repairmen, and the trade in general.

Several reasons are known why plugs have not fulfilled the criteria demanded. One is that the bonding cements or materials have not adequately intimately joined the plug to the tire. Another reason is that the plug and cement injection tools available have not distributed the cement in adequate amounts uniformly between the adjacent surfaces of the plug and the tire.

The subject invention constitutes further developments of the apparatus of my prior application whereby the problems discussed above, and others, are overcome.

Accordingly, it is an object of the present invention to enable a dependable bond to be effected between a workpiece and a plug fitted in a hole of the workpiece.

Another object is to provide an apparatus for inserting a plug and a bonding material therefor into a hole in a workpiece.

Another object is to distribute the bonding cement for a patching plug uniformly between the surfaces of the plug and the adjacent surfaces of the workpiece.

Another object is to provide an apparatus for holding a plurality of bonding materials uniformly in isolation from each other and subsequently for intermixing the bonding material preparatory to application to a patching plug and a workpiece into which the plug is inserted.

Another object is to enable a patching plug to provide a dependable air-tight seal in a puncture hole of a tire under rugged as well as normal driving conditions.

Another object is to enable the repair of an inflated tubeless tire externally of the tire without removing it from the rim.

Other objects are to provide a patching apparatus of the nature described which is economical to manufacture and use, dependable and durable, and adapted to plug holes of various sizes.

These, together with other objects, will become more fully apparent upon reference to the following description.

In the drawings:

Fig. 1 is a longitudinal section of a patching apparatus constructed in accordance with the principles of the present invention and shown in initially inserted position is a puncture hole of a tire, a fragment of which is illustrated in cross section.

Fig. 2 is a view similar to Fig. 1 but with more of the apparatus in side elevation and with the patching apparatus in an intermediate stage of operation.

Fig. 3 is a view similar to Fig. 1 but with more of the apparatus in side elevation and in a still further advanced stage of operation from that shown in Fig. 2.

Fig. 4 is a fragmentary side elevation of an end of the patching apparatus and a cross section of a tire and showing the apparatus in a still further advanced stage of operation from that shown in Fig. 3.

Fig. 5 is a transverse section of the apparatus taken on a plane at a position represented by line 5—5 of Fig. 1.

Fig. 6 is a transverse section of the apparatus taken on a plane at a position represented by line 6—6 of Fig. 1.

Fig. 7 is a perspective view of a cement receptacle including a pair of cement capsules separated from the receptacle all as employed in a cartridge of the present invention.

Fig. 8 is a perspective view of the apparatus in partially disassembled condition.

Fig. 9 is a fragmentary side elevation partially in cross section of an end of a second form of cartridge including a second form of patching plug.

Referring more particularly to the drawings, an injecting tool employed in the patching apparatus of the subject invention is generally indicated by the numeral 10. The tool has an elongated substantially cylindrical outer housing 11 providing a forwardly disposed open workpiece end 12 terminating in an annular end face 13 and a rearwardly disposed adjustment end 14. A disc-shaped end wall 15 is fitted in the adjustment end of the housing and secured therein by means of screws 16 transversely extended through the housing and into the end wall. The end wall provides a threaded bore 17 concentric to the housing.

An elongated, substantially cylindrical inner sleeve 20 is concentrically slidably fitted in circumferential engagement within the housing 11 and provides a forwardly disposed workpiece end 21 adjacent to the workpiece end 12 of the housing and a rearwardly disposed adjustment end 22 adjacent to the adjustment end 14 of the housing. The workpiece end of the sleeve is also open but a cylindrical bushing 24 is fitted in the adjustment end 22. The bushing provides a central bore 25 concentric to the bore 17. The bushing is held within the sleeve by means of screws 26 transversely extended through the sleeve into the bushing. The sleeve includes a pair of diametrically opposed, elongated, longitudinally extended slots 27 intermediate the workpiece and adjustment ends of the sleeve. It is to be noted that when the bushing is in contact with the end wall 15, the workpiece end of the sleeve extends endwardly slightly from the workpiece end of the housing.

The tool 10 also includes an elongated manipulating shank 30 having an elongated threaded portion 31 screw-threaded in the bore 17 of the end wall 15, a smooth portion 32 rotatably fitted in the smooth bore 25 of the bushing 24, and a threaded terminal end 33 within the sleeve 20. A nut 34 is screw-threaded on the terminal end of the shank internally against the bushing 24 for releasably interconnecting the shank and the sleeve.

A handle bar 35 provides a socket 37 fitted over the outwardly extended end of the shank 30, and a setscrew 38 is transversely extended through the handle bar and the shank for holding the bar on the shank in transverse relation thereto. In this manner the shank can be conveniently threaded inwardly or outwardly of the housing by manual manipulation of the handle bar. This, of course, effects longitudinal slidable movement of the sleeve relative to the housing so as to move the sleeve relatively inwardly and outwardly of the adjustment end 12 of the housing.

Also included within the tool 10 is a mounting member 40 slidably fitted within the adjustment end 12 of the housing 11. The mounting member includes a substantially cylindrical mounting block 41 having an inwardly disposed bore 42 concentric to the housing and a diametrically larger outwardly disposed socket 43 which is threaded into its mouth. The socket has an inner annular seat 44 radially related to the mounting block. Setscrews 45 are radially extended through the housing 11, the slots 27, and into the mounting block so that the block is connected to the housing for movement therewith relative to the sleeve 20. A holding member 50 is also included as part of the mounting member and provides a threaded male portion 51 releasably screw-threadably fitted in the mouth of the socket of the mounting block, a diametrically enlarged head 52 tightened against the annular end face of the mounting block when the male portion is fully threaded into the socket, an axial bore 53 concentric to the housing 11, and an inwardly disposed annular end face 54 in longitudinally spaced, opposed, parallel relation to the annular seat 44 of the socket. Further, it is to be noted that the bore 53 of the holding member is substantially of the same diameter as the bore 42 of the mounting block.

An elongated plunger 60 includes a mounting portion 61 fitted within and circumferentially engaging the sleeve 20 adjacent to its adjustment end 22 and connected thereto by means of a pin 62 transversely extended through the mounting portion and the sleeve. The plunger has a substantially cylindrical elongated extended rod 63 concentric to the housing and fitted within the bore 42 of the mounting block 41 in circumferentially spaced relation thereto when the bushing 24 is in contact with the end wall 15, as illustrated in Fig. 1. The rod 63 provides a cylindrical cavity 64 in its extended end which has an inner radial wall 65 and which is circumscribed by an annular rim 66. When the sleeve 20 is moved longitudinally endwardly of the housing 11 by means of the shank 30, the annular rim of the plunger 60 moves into the socket 43 of the mounting block 41, as best illustrated in Figs. 2 and 3.

The patching apparatus also includes a plug and cement holding cartridge 70, best illustrated in longitudinal cross section in Figs. 1, 2 and 3, and in external perspective in Fig. 8. The cartridge includes an elongated outer rigid tube 71 having an elongated substantially cylindrical penetrating shank 72 terminating in a forwardly disposed workpiece end edge 73 and providing an elongated concentric bore 74. The outer tube also has a substantially cylindrical barrel or housing portion 75 diametrically larger than and extended in the opposite direction from the penetrating shank and terminating in a rearwardly disposed mounting end edge 76. The barrel circumscribes a substantially cylindrical recess or chamber 77 diametrically larger than the bore 74 and having a radial base 78. The barrel further provides an annular boss 79 endwardly extended from the base diametrically reduced from the maximum diameter of the barrel and defining an annular forwardly disposed shoulder 80.

The cartridge 70 also includes an annular cement receptacle 85 including an annular outer wall 86, a radially inwardly spaced inner wall 87 concentric to the outer wall, an end wall 87' radially interconnecting the inner and outer walls, and a rearwardly disposed annular end opening 88 opposite to the end wall. The inner wall circumscribes an elongated bore 89 of substantially the same diameter as the bore 74 of the outer tube 71, and the inner and outer walls define an annular chamber 90 therebetween. It is significant to note that the annular rim 66 of the plunger 60 has a diameter greater than the diameter of the inner wall of the cement receptacle but less than the diameter of the outer wall. The end wall of the receptacle is provided with a plurality of orifices 91. The cement receptacle is slidably fitted in the recess 77 of the barrel 75 with the end wall in abutment with the base 78 and with the bore 89 forming a continuous extension of the bore 74. It will be noted from Figs. 1, 2 and 3 that the barrel and the receptacle are of approximately the same length.

An elongated inner tube 95 is also included as part of the cartridge 70 and provides a rearwardly disposed, annular, radially outwardly extended adjustment flange 96, an elongated concentric bore 97, and a plurality of peripherally spaced, elongated longitudinally extended grooves 98 having forwardly and rearwardly disposed ends 99 and 100. The inner tube also has a penetrating end edge 101.

A patching plug 107 includes an elongated stem 108 extended within the bore 97 of the inner tube 95, and a mushroom-shaped head 109. When the plug is loaded into the cartridge 70, the head is folded backwardly toward the stem and fitted between the inner and outer tubes 95 and 71, respectively, as best seen in Fig. 1. However, the penetrating end edge 101 of the inner tube is in engagement with the head 109. A conical cap 110 provides a diametrically reduced reduced base 111 frictionally fitted within the penetrating end of the shank 72, and an extended tip 112. The inner tube is slidably extended through the aligned bores 74 and 89 of the outer tube 71 and the cement receptacle 85 so that the outer surface of the inner tube slidably engages the shank 72 and the inner wall 87, and so that the penetrating end edge 101 is in inwardly adjacent relation to the penetrating end edge 73 of the outer tube 71 and the adjustment flange 96 is longitudinally spaced endwardly from the barrel and the cement receptacle, all as best seen in Fig. 1. As such, it will be noted that the grooves 98 are extended from the recess 77 of the barrel into the shank.

The cartridge 70 also provides an annular piston 115 longitudinally slidably fitted in the chamber 90 of the cement receptacle 85 for longitudinal slidable movement toward the end wall 87' from an initial position closing the opening 88 to the chamber. A plurality of hollow rupturable elongated capsules 116 preferably of gelatin material are fitted within the chamber 90 of the cement receptacle and contain a vulcanizing liquid 117. A quantity of raw rubber 118 fills the remainder of the chamber adjacent to the capsules. It is sufficient to note that the vulcanizing liquid reacts with the raw rubber upon contact therewith to form a flowable bonding agent.

The capsules, although breakable under pressure to release the vulcanizing liquid, are effective to isolate the vulcanizing liquid from the raw rubber until broken. Obviously, the capsules may be of any desired shape. Further the invention is not to be limited to the number of capsules illustrated nor, in fact, to more than one such capsule.

Operation

The operation of the described embodiment of the subject invention is believed to be readily apparent and is briefly summarized at this point.

In considering the operation, reference is conveniently made to a fragment of a tire 125 having an inwardly disposed surface 126, an outwardly disposed surface 127 and a puncture hole 128 extended through the tire between the surfaces thereof.

The carriage 70 is assembled as described and as best shown in Fig. 8. The holding member 50 is screw-threaded out of the mounting block 41. The adjustment end 96 of the inner tube 95 is then fitted within the socket 43 and the bore 42 of the mounting block and further within the cavity 64 of the plunger 60 until the flange 96 abuts the inner wall 65. In this position the mounting edge 76 of the barrel 75 and the outer wall 86 of the receptacle 85 are in abutment with the annular seat 44 of the socket. The holding member 50 is then fitted over the penetrating end 73 of the shank 72 and screw-threaded into the mouth of the socket 43 whereby the end face 54 abuts the shoulder 80 of the barrel. This holds the barrel and the cement receptacle tightly between the seat and the holding member in substantially concentric relation to the housing and aligns the chamber 90 with the rim 66.

The tool 10 is then grasped and the tip 112 of the cap 110 placed against the outside surface 127 of the tire 125 over the hole 128. By thrusting forwardly on the tool toward the tire, the penetrating shank 72 is forced into the hole and through the tire so that the cap 110 and the penetrating end edges 73 and 101 of the tubes are all located within the tire adjacent to its inwardly disposed surface 126. It is to be noted that the head 109 of the plug 107 is also located within the tire and that the holding member 50 engages the outwardly disposed surface 127 of the tire.

The shank 30 is then screwed into the end wall 15 to move said end wall and the bushing 24 relatively away from each other. Initially, the sleeve 20 moves into engagement with the tire 125. During this movement, the plunger 60 slides the inner tube 95 inwardly of the tire relative to the outer tube 71 to force the head 109 of the plug 107 endwardly out of the outer tube into the position shown in Fig. 2. The cap 110, of course, is forced out of the outer tube. Continued rotation of the shank brings the piston 115 into engagement with the annular rim 66 so as to apply pressure on the capsule 116 and the rubber 118. Since the sleeve can move no further toward the tire, the housing 11 is slid away from the tire over the sleeve which draws the shank 72 outwardly of the hole 128; engagement of the piston and rim thus occurs because the barrel and the receptacle are pulled radially outwardly of the tire by the housing.

Pressure on the capsules 116 eventually ruptures the capsules to release the vulcanizing liquid 117 whereupon it reacts with the raw rubber 118 to form a flowable bonding material. The relatively advancing piston extrudes this bonding material through the orifices 91 and into the grooves 98 whereupon the material is conducted along the inner tube 95 and the shank 72. This applies the bonding material to the tire 125 around the hole 128 and also to the inwardly disposed surface 126 of the tire around the hole. Still further, bonding material is applied to the undersurface of the head 109.

When the piston 115 has ejected most of the bonding material from the chamber 90, the shank 72 is almost entirely removed from the hole 128 as illustrated in Fig. 3. Thereupon, the entire tool 10 is pulled away from the tire 125, as illustrated in Fig. 4, to remove the inner tube 95 from the stem 108 of the plug 107 thereby to bring the stem into contact with the bonding material which has been applied around the hole. The final step is to pull manually outwardly on the stem to insure that the head of the plug is in flush engagement with the inwardly disposed surface 126 of the tire and then to rotate the stem to spread the bonding material circumferentially between theh adjacent surfaces of the tire and the plug.

The holding member 50 is then removed to enable release of the spent cartridge 70. After the inner and outer tubes have been cleaned, a new and filled receptacle 85 is fitted in the barrel 75 and a new plug 107 is fitted in the tubes, as described. The cartridge 70 and tool 10 may then be used again for patching another hole.

Second form of cartridge and plug

With reference to Fig. 9, a second form of cartridge 150 is partially illustrated. This cartridge includes an elongated outer tube 151 having a barrel 152 as before and an elongated shank 153. The barrel is adapted to contain a bonding material which is extruded by an annular piston, not shown, but similar to the first form of the invention. The shank extends to a penetrating end including a plurality of elongated longitudinally extended substantially equally circumferentially spaced slits 154 opening endwardly of the shank. Further, the shank is tapered inwardly toward the penetrating end along a smooth curvature. The slits define laterally resiliently flexible tongues 155 adapted for expansion incident to application of pressure internally of the shank diametrically to expand the opening at the end of the shank. The tongues, however, are of such resilience to return to their relaxed positions, as shown in Fig. 9, upon removal of the internal pressure. Further, the shank has a plurality of perforations 156 between the barrel and the tongues.

An elongated tube 160 extends concentrically within the outer tube 151, as before, but provides an annular recess 161 at its penetrating end which recess is located within the tongues of the outer tube. A patching plug 163 includes an elongated stem 164 extended through the inner tube and a head 165 normally extended outwardly from the stem but when mounted within the cartridge folded backwardly against the recess of the inner tube between the inner tube and the tongues of the outer tube. However, the second form of plug includes a plurality of annular, longitudinally spaced beads 166 adjacent to the head of the plug.

In use, the cartridge 150 may be emptied by use of the tool 10. The action in removing the plug 163 from the tubes 151 and 160 is the same as described above. However, bonding material can escape from the shank 153 through the perforations 156. Further, the tongues distend incident to relative sliding movement of the tubes by engagement of the head 165 to release the head from the shank 153, such as was described above and as shown in Fig. 2. After the plug has been positioned in the puncture hole and the tool is removed therefrom, the stem 164 is stretched by pulling outwardly thereon away from the tire 125. This stretching causes the beads to be spaced farther from each other along the length of the puncture hole 128. When the stem is relaxed, the stem contracts longitudinally and expands laterally. The beads thus slide longitudinally inwardly of the hole and carry bonding material longitudinally inwardly of the hole around the stem. Thus, these beads act as piston rings tending to keep the bonding material within the hole and to insure sufficient application of such material toward the inner surface of the tire.

It will be evident from the foregoing that a highly effective apparatus has been provided for patching a hole in a tire, or other workpiece, in a quick and efficient manner. The invention is particularly advantageous inasmuch as it enables uniform and adequate distribution of bonding material to the adjacent and contacting surfaces of the plug and the tire. Further, more effective bonding materials can be employed inasmuch as they are held in isolation by the apparatus until actually needed. It has been found that tires patched with plugs inserted in puncture holes of the tires and bonded thereto by the devices of the present invention have withstood severe and rugged driving tests without said plugs becoming loose or developing air leaks.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a cartridge for injecting cement into a hole of a workpiece; a cylindrical barrel circumscribing a recess; an elongated shank endwardly extended from the barrel adapted to be extended through the hole of a workpiece and circumscribing a bore concentric to the recess; an annular cement receptacle fitted in the recess having an outer wall engaging the barrel, a radially inwardly spaced inner wall, an end wall radially interconnecting the inner and outer walls providing an orifice, an opposite end opening, and a chamber between the inner and outer walls adapted to contain a bonding cement; and an annular piston longitudinally slidably mounted in the chamber for forcing bonding cement out of the orifice into the bore of the chamber incident to longitudinal slidable movement of the piston.

2. In a cartridge for use in inserting a plug in a hole and for applying cement between the plug and the workpiece for bonding the plug to the workpiece, an elongated outer tube having an elongated tubular shank adapted to extend into such a hole of a workpiece, and a housing portion endwardly extended from the shank in radially outwardly offset relation to the shank and adapted to extend outwardly of the workpiece, an elongated inner tube releasably extended within the outer tube having an outer circumferential surface circumferentially spaced from the housing portion and defining with the housing portion a recess adapted to contain a flowable bonding cement, said outer surface also being spaced from the shank to enable cement to travel longitudinally along the shank and the inner tube and out of the shank, the tube being adapted to receive an elongated plug releasably slidably therein, and an annular piston mounted within the recess and being movable longitudinally thereof toward the shank for forcing cement in the recess into the space between the inner tube and the shank whereby upon removal of the shank from the inner tube and the hole and subsequent removal of the inner tube from the hole and from the plug, such cement is applied between the workpiece and the plug.

3. In a cartridge for use in inserting a plug in a hole of a workpiece and for applying cement between the plug and the workpiece for bonding the plug to the workpiece, an elongated tubular shank adapted to extend into such a hole of a workpiece, a tubular barrel substantially concentrically extended from the shank and adapted to extend outwardly of the workpiece, an elongated tube substantially concentrically releasably extended within the barrel and the shank and having an outer annular surface circumferentially spaced from the barrel and defining with the barrel a recess adapted to contain a flowable bonding cement, said outer annular surface also slidably engaging the shank and having an elongated longitudinally extended groove communicating with the recess and adapted to conduct cement from the recess longitudinally along the shank and the tube and out of the shank, the tube being adapted to receive an elongated plug releasably slidably therein, and an annular piston circumscribing the tube within the recess and being movable longitudinally thereof toward the shank for forcing cement in the recess into the groove whereby upon removal of the shank from the tube and the hole and subsequent removal of the tube from the hole and from the plug, such cement is applied between the workpiece and the plug.

4. A tool comprising an outer housing having opposite ends, one of said ends being open, a sleeve concentrically mounted in the housing for longitudinal slidable movement having an open end in registration with the open end of the housing and a longitudinally extended slot, a mounting block positioned within the sleeve having a bore concentrically axially extended therethrough and an endwardly opening socket adjacent to the open ends of the housing and sleeve and diametrically larger than the bore, means extended through the slot in the sleeve interconnecting the housing and the block, a plunger mounted within the sleeve and secured thereto in axial alignment with the bore in the block having an extended end providing an endwardly opening cavity circumscribed by an annular rim and being longitudinally movable within the bore of the block incident to slidable movement of the sleeve in the housing, a holding member releasably fitted in the socket of the mounting block having a bore axially aligned with the bore of the block, and means interconnecting the end of the housing opposite to the open end and the sleeve for longitudinally slidably moving the housing and the sleeve relative to each other.

5. A tool comprising an outer housing having an open end and an opposite closed end, a sleeve concentrically mounted in the housing for longitudinal slidable movement having an open end in registration with the open end of the housing and a longitudinally extended slot, a mounting block positioned within the sleeve having a bore concentrically axially extended therethrough and an endwardly opening socket adjacent to the open ends of the housing and sleeve, the socket having an inner radial seat, a setscrew mounted in the housing and extended through the slot in the sleeve into the block, a plunger mounted within the sleeve and secured thereto in axial alignment with the bore in the block having an extended end providing an endwardly opening cavity circumscribed by an annular rim and being longitudinally movable within the bore of the block incident to slidable movement of the sleeve in the housing, a holding member releasably fitted in the socket of the mounting block having a bore axially aligned with the bore of the block and an annular end face longitudinally spaced from the seat of the socket when the holding member is fitted in the socket, and an elongated manipulating shank having a portion axially screw-threaded through the closed end of the housing and an end within the housing rotatably connected to the sleeve.

6. A fluid ejecting apparatus comprising a fluid receptacle having inner and outer circumferentially spaced annular walls, an end wall radially inwardly extended from the outer wall toward the inner wall so as to define a recess between the walls adapted to contain a fluid, the recess having an outlet and an annular opening opposite to the outlet; an annular piston longitudinally slidably mounted in said recess between the inner and outer walls of the receptacle for extruding fluid in the recess out of the outlet; an elongated housing having an open end; a sleeve slidably mounted in the housing having an open end adjacent to the open end of the housing for longitudinal movement in and out of said open end of the housing; means interconnecting the housing and the sleeve for moving said fluid housing and the sleeve axially relative to each other; a plunger connected within the sleeve having a cavity opening endwardly toward the open end of the housing and circumscribed by an annular rim diametrically larger than said inner wall and diametrically smaller than said outer wall; and means connected to the housing mounting the receptacle within the open end of the sleeve with the annular opening in the receptacle facing the annular rim and in alignment therewith whereby upon longitudinal movement of the plunger toward the receptacle incident to movement of the housing and the sleeve away from each other, the rim engages the piston and moves the piston longitudinally in the recess.

References Cited in the file of this patent

UNITED STATES PATENTS

| | | |
|---|---|---|
| 594,869 | Griswold | Dec. 7, 1897 |
| 607,379 | Jones | July 12, 1898 |
| 864,226 | Blodgett | Aug. 27, 1907 |
| 1,332,412 | Ranney | Mar. 2, 1920 |
| 1,348,005 | Hirst | July 27, 1920 |
| 1,597,945 | Young | Aug. 31, 1926 |
| 1,657,810 | Watson | Jan. 31, 1928 |
| 2,727,554 | Westfall | Dec. 20, 1955 |
| 2,804,792 | Westfall | Sept. 3, 1957 |